(12) United States Patent
Yin

(10) Patent No.: US 12,107,752 B2
(45) Date of Patent: Oct. 1, 2024

(54) PATH DETERMINING METHOD AND RELATED DEVICE

(71) Applicant: HUAWEI TECHNOLOGIES CO., LTD., Guangdong (CN)

(72) Inventor: Yuanbin Yin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 325 days.

(21) Appl. No.: 17/573,934

(22) Filed: Jan. 12, 2022

(65) Prior Publication Data

US 2022/0141121 A1 May 5, 2022

Related U.S. Application Data

(63) Continuation of application No. PCT/CN2020/101947, filed on Jul. 14, 2020.

(30) Foreign Application Priority Data

Jul. 18, 2019 (CN) .......................... 201910649763.1
Dec. 9, 2019 (CN) .......................... 201911252648.7

(51) Int. Cl.
*H04L 45/02* (2022.01)
*H04L 43/0852* (2022.01)
*H04L 45/12* (2022.01)

(52) U.S. Cl.
CPC .......... *H04L 45/02* (2013.01); *H04L 43/0852* (2013.01); *H04L 45/124* (2013.01)

(58) Field of Classification Search
None
See application file for complete search history.

(56) References Cited

U.S. PATENT DOCUMENTS

| 10,230,605 B1 | 3/2019 | Filsfils et al. |
| 2009/0228575 A1 | 9/2009 | Thubert et al. |

(Continued)

FOREIGN PATENT DOCUMENTS

| CN | 103477595 A | 12/2013 |
| CN | 104735745 A | 6/2015 |

(Continued)

OTHER PUBLICATIONS

Pier Luigi Ventre et al., "SDN Architecture and Southbound APIs for IPV6 Segment Routing Enabled Wide Area Networks", Submitted to IEEE Transactions on Network and Service Management, arXiv:1810.06008v1 [cs.NI] Oct. 14, 2018, Total 14 Pages.

(Continued)

*Primary Examiner* — Hong Shao
(74) *Attorney, Agent, or Firm* — WOMBLE BOND DICKINSON (US) LLP

(57) ABSTRACT

This application provides a path determining method and a related device. The method includes: determining $N_1$ first-type nodes from N nodes included in a first network topology, where the N nodes include the $N_1$ first-type nodes and $N_2$ second-type nodes, and the first-type node supports SRv6; determining a second network topology corresponding to the first network topology, where the second network topology includes the $N_1$ first-type nodes but does not include the $N_2$ second-type nodes, and the target topology structure includes M first-type target paths; determining transmission overheads of the M first-type target paths, where a transmission overhead of an $i^{th}$ first-type target path is a smallest value of transmission overheads of a $K_i$ paths; and performing path computation based on the transmission overheads of the M first-type target paths and the second network topology.

20 Claims, 3 Drawing Sheets

(56) References Cited

U.S. PATENT DOCUMENTS

| | | |
|---|---|---|
| 2014/0036726 A1 | 2/2014 | Kusumoto |
| 2020/0195568 A1* | 6/2020 | Ali ..................... H04L 43/0858 |
| 2020/0204469 A1* | 6/2020 | Filsfils ................. H04L 45/123 |

FOREIGN PATENT DOCUMENTS

| | | |
|---|---|---|
| CN | 107181520 A | 9/2017 |
| CN | 108574594 A | 9/2018 |
| CN | 109768883 A | 5/2019 |
| CN | 109922004 A | 6/2019 |
| WO | 2017141079 A1 | 8/2017 |

OTHER PUBLICATIONS

3GPP TS 29.892 V1.2.0 (May 2019)3rd Generation Partnership Project; Technical Specification Group Core Network and Terminals; Study on User Plane Protocol in 5GC.(Release 16), Total 49 Pages.

* cited by examiner

PATH DETERMINING METHOD AND RELATED DEVICE

CROSS-REFERENCE TO RELATED APPLICATIONS

This application is a continuation of International Application No. PCT/CN2020/101947, filed on Jul. 14, 2020, which claims priority to Chinese Patent Application No. 201910649763.1, filed on Jul. 18, 2019 and Chinese Patent Application No. 201911252648.7, filed on Dec. 9, 2019. All of the aforementioned patent applications are hereby incorporated by reference in their entireties.

TECHNICAL FIELD

This application relates to the field of communications technologies, and more specifically, to a path determining method and a related device.

BACKGROUND

In recent years, segment routing (SR) technologies have been widely applied in a $5^{th}$ generation 5G) system, the internet of things, a multi-cloud network, and the like. The SR technologies may be classified into two types: an SR technology based on multi-protocol label switching (MPLS), which may be referred to as SR-MPLS, and an SR technology based on the internet protocol version 6 (IPv6), which may be referred to as SRv6.

Currently, if the SRv6 technology needs to be used, all devices in a network need to support SRv6. Only in this way can a controller obtain a network topology and calculate a path that meets a service level agreement (SLA). However, it is too difficult for an operator to upgrade all the devices in the network. On one hand, because there are a large quantity of devices in the network, it takes a relatively long time to upgrade all the devices in the network. On another hand, some devices require hardware upgrade to support SRv6. This increases upgrade costs.

SUMMARY

This application provides a path determining method and a related device, so that a new network topology may be established by using an existing network topology structure, to reduce difficulty in path computation, thereby reducing a burden of a management device.

According to a first aspect, an embodiment of this application provides a path determining method, including: determining $N_1$ first-type nodes from N nodes included in a first network topology, where the N nodes include the $N_1$ first-type nodes and $N_2$ second-type nodes, the first-type node supports segment routing over internet protocol version 6 SRv6, $N_1$ is a positive integer greater than or equal to 2, and $N_2$ is a positive integer greater than or equal to 1; determining a second network topology corresponding to the first network topology, where the second network topology includes the $N_1$ first-type nodes but does not include the $N_2$ second-type nodes, the target topology structure includes M first-type target paths, an $i^{th}$ first-type target path in the M first-type target paths corresponds to $K_i$ paths in the first network topology, a source node and a destination node of the $K_i$ paths are the same as a source node and a destination node of the $i^{th}$ first-type target path, each of the $K_i$ paths includes at least one second-type node, M is a positive integer greater than or equal to 1, i=1, ..., or M, and $K_i$ is a positive integer greater than or equal to 2; determining transmission overheads of the M first-type target paths, where a transmission overhead of the $i^{th}$ first-type target path is a smallest value of transmission overheads of the $K_i$ paths; and performing path computation based on the transmission overheads of the M first-type target paths and the second network topology.

In the foregoing technical solution, a new network topology may be established by using an existing network topology structure. The new network topology includes only some nodes in the original network topology, and all these nodes support SRv6. In this way, difficulty in path computation may be reduced, to reduce a burden of a management device.

In one embodiment, the first-type node is a node that supports SRv6 in the N nodes, and the second-type node is a node that does not support SRv6 in the N nodes. In one embodiment, the first-type node is a key node in the N nodes, and the second-type node is a non-key node in the N nodes.

In the foregoing technical solution, a node that does not support SRv6 and/or a non-key node in the original network topology may be removed, to obtain the new network topology. All nodes in the network topology support SRv6. In this way, even if a node that does not support SRv6 exists in a network, a packet may be forwarded based on a path determined by the management device. In one embodiment, the non-key node is ignored during path computation, so that the difficulty in path computation may be reduced, to reduce the burden of the management device.

In one embodiment, the method further includes: obtaining a transmission overhead between two adjacent nodes in the first network topology. The determining transmission overheads of the M first-type target paths includes: determining a transmission overhead of each of the $K_i$ paths based on a transmission overhead between two adjacent nodes on each of the $K_i$ paths, and determining the smallest value of the transmission overheads of the $K_i$ paths as the transmission overhead of the $i^{th}$ first-type target path.

In one embodiment, the determining transmission overheads of the M first-type target paths includes: performing transmission overhead measurement on the $i^{th}$ first-type target path to obtain the transmission overhead of the $i^{th}$ first-type target path.

The transmission overhead of the $i^{th}$ first-type target path may be directly obtained through measurement by using the foregoing technical solution. In other words, when a transmission overhead is obtained through measurement, a node on a path forwards a measurement packet based on a shortest path. Therefore, the obtained transmission overhead is a smallest transmission overhead. Therefore, the smallest value of the transmission overheads may be directly obtained by using the foregoing technical solution, to reduce a workload of the management device.

In one embodiment, the performing transmission overhead measurement on the $i^{th}$ first-type target path to obtain the transmission overhead of the $i^{th}$ first-type target path includes: sending measurement information to the source node and/or the destination node of the $i^{th}$ first-type target path; and receiving measurement feedback information from the source node and/or the destination node of the $i^{th}$ first-type target path, where the measurement feedback information includes the transmission overhead of the $i^{th}$ first-type target path.

In one embodiment, the second network topology further includes P second-type target paths, and each of the P second-type target paths includes two of the $N_1$ first-type nodes, and the first network topology includes the P second-type target paths.

In one embodiment, the transmission overhead includes a transmission cost and/or a transmission delay.

According to a second aspect, an embodiment of this application provides a management device. The management device includes units configured to implement any possible implementation of the method design in the first aspect. The management device may be a computer device or a component (for example, a chip or a circuit) configured for a computer device.

According to a third aspect, an embodiment of this application provides a management device, including a transceiver and a processor. Optionally, the management device further includes a memory. The processor is configured to control the transceiver to send and receive signals. The memory is configured to store a computer program. The processor is configured to invoke the computer program from the memory and run the computer program, so that the management device is enabled to perform the method in any possible implementation of the method design in the first aspect.

According to a fourth aspect, an embodiment of this application provides an electronic apparatus. The electronic apparatus may be a management device configured to implement the method design in the first aspect, or may be a chip disposed in a management device. The electronic apparatus includes a processor. The processor is coupled to a memory and may be configured to execute instructions and/or program code in the memory, to implement the method in any possible implementation of the method design in the first aspect. Optionally, the electronic apparatus further includes the memory. In one embodiment, the electronic apparatus further includes a communications interface, and the processor is coupled to the communications interface.

When the electronic apparatus is a management device, the communications interface may be a transceiver or an input/output interface.

When the electronic apparatus is a chip disposed in a management device, the communications interface may be an input/output interface.

In one embodiment, the transceiver may be a transceiver circuit. In one embodiment, the input/output interface may be an input/output circuit.

According to a fifth aspect, an embodiment of this application provides a computer program product. The computer program product includes computer program code. When the computer program code is run on a computer, the computer is enabled to perform the method in any possible implementation of the method design in the first aspect.

According to a sixth aspect, an embodiment of this application provides a computer-readable medium. The computer-readable medium stores program code. When the computer program code is run on a computer, the computer is enabled to perform the method in any possible implementation of the method design in the first aspect.

DESCRIPTION OF EMBODIMENTS

Figure 1:
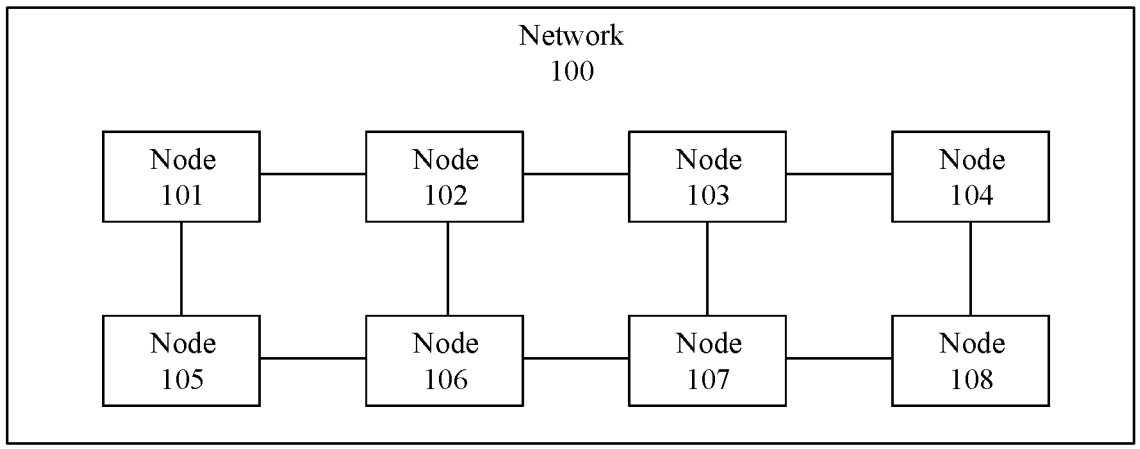
FIG. 1 is a schematic diagram of a network structure.

The following describes the technical solutions of this application with reference to the accompanying drawings.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompany drawings. In addition, a combination of these solutions may be used.

In addition, in the embodiments of this application, the terms such as "example" and "such as" are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In the embodiments of this application, if a technical means, operation, or limitation is not emphasized as mandatory, it indicates that the technical means, operation, or limitation is optional.

In the embodiments of this application, information, a signal, a message, or a channel may be interchangeably used sometimes. It should be noted that meanings expressed by the terms are consistent when differences between the terms are not emphasized. "Relevant" and "corresponding" may be interchangeably used sometimes. It should be noted that meanings expressed by the terms are consistent when differences are not emphasized.

In the embodiments of this application, sometimes a subscript such as $W_1$ may be written in an incorrect form such as W1. Expressed meanings are consistent when differences are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

Reference to "an embodiment", "some embodiments", or the like described in this specification indicates that one or more embodiments of this application include a specific feature, structure, or characteristic described with reference to the embodiments. Therefore, statements, such as "in an embodiment", "in some embodiments", "in some other embodiments", and "in other embodiments", that appear at different places in this specification do not necessarily mean referring to a same embodiment, instead, the statements mean referring to "one or more but not all of the embodiments", unless otherwise specifically emphasized in other ways. The terms "include", "comprise", "have", and variants of the terms all mean "include but are not limited to", unless otherwise specifically emphasized in other ways.

In this application, "at least one" means one or more, and "a plurality of" means two or more. The term "and/or" describes an association between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof means any combination of the following, including any combination of one or more of the following. For example, at least one of a, b, or c may represent: a, b, c, a and b, a and c, b and c, or a, b, and c, where a, b, and c may be singular or plural.

FIG. 1 is a schematic diagram of a network structure. A network 100 shown in FIG. 1 includes eight nodes: a node 101, a node 102, a node 103, a node 104, a node 105, a node 106, a node 107, and a node 108. The network 100 may be a complete network or part of a complete network.

The nodes (namely, the node 101 to the node 108) in the network 100 shown in FIG. 1 may also be referred to as network nodes. The node may be a device such as a workstation, a server, a terminal device, or a network device. Each device may have a different IPv6 address. Two adjacent nodes (for example, the node 101 and the node 102, the node 102 and the node 103, or the node 101 and the node 105) in the network 100 shown in FIG. 1 may be connected by using a wired or wireless medium. An intermediate device may not be included between the two adjacent nodes, or one or more intermediate devices (for example, some switches or optical devices) that do not perform Layer 3 forwarding (namely, forwarding based on an internet protocol (IP) address) on a packet may be included between the two adjacent nodes.

The nodes in the network 100 may be classified into a first-type node and a second-type node.

Optionally, in some embodiments, both the first-type node and the second-type node support SRv6. The first-type node is a key node in the network 100, and the second-type node is a non-key node in the network 100. In some embodiments, the key node may be a border node between two networks. For example, the network may include an access layer, an aggregation layer, a core layer, and the like. Key nodes may be border nodes at these layers. Optionally, in some other embodiments, the key node may be an egress edge node in a network. Correspondingly, the non-key node may be another node other than the key node.

In some other embodiments, the first-type node is a node that supports SRv6, and the second-type node is a node that does not support SRv6.

Alternatively, the first-type node may be a node that supports SRv6 and the first-type node is a key node in the network 100, and the second-type node may be a node that does not support SRv6, or the second-type node may be a node that supports SRv6 and the second-type node is a non-key node in the network 100.

For ease of description, in the following embodiments, it is assumed that the first-type node is the node that supports SRv6, and the second-type node is the node that does not support SRv6.

Figure 2:
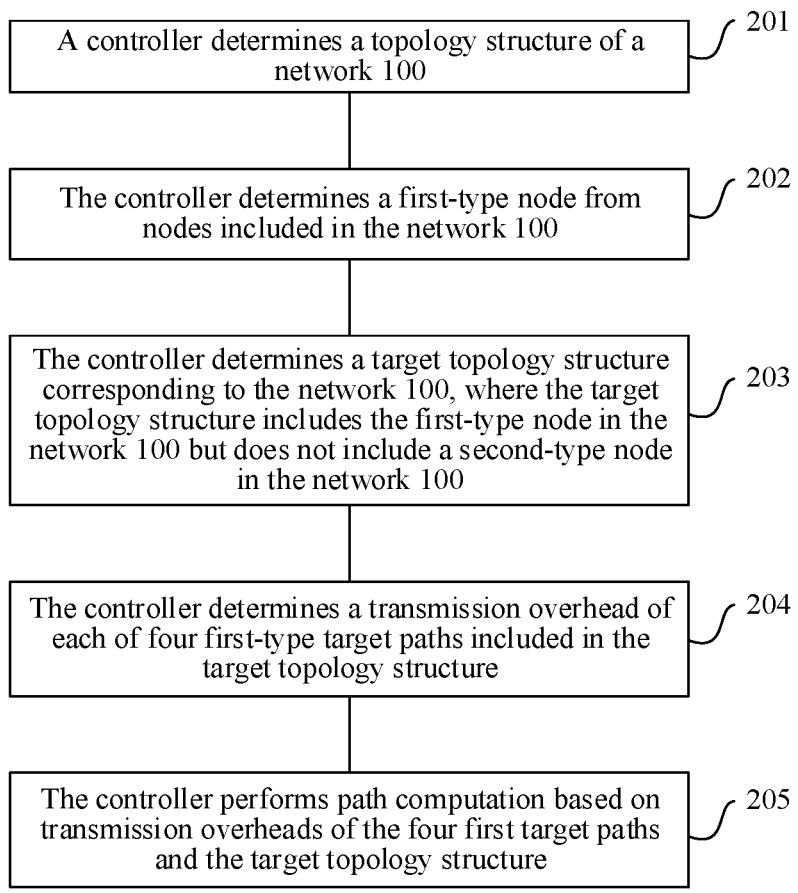
FIG. 2 is a schematic flowchart of a path determining method according to an embodiment of this application.

With reference to the network structure shown in FIG. 1, the technical solutions of this application are described in detail in FIG. 2. For ease of description, in an embodiment shown in FIG. 2, it is assumed that the node 102 and the node 106 are nodes that do not support SRv6. The node 101, the node 103, the node 104, the node 105, the node 107, and the node 108 are nodes that support SRv6. It may be understood that the specific embodiment shown in FIG. 2 is merely intended to help a person skilled in the art better understand the technical solutions of this application, but is not intended to limit the technical solutions of this application to a limited embodiment.

FIG. 2 is a schematic flowchart of a path determining method according to an embodiment of this application. The method shown in FIG. 2 may be performed by a management device in a network. The management device may be a general-purpose computer device, for example, a notebook computer or a personal computer, or may be a dedicated network management device.

Operation 201: The management device determines a topology structure of the network 100.

A specific implementation in which the management device obtains the topology structure of the network 100 is not limited in this embodiment of this application. For example, the management device may establish a border gateway protocol-link state (BGP-LS) or an interior gateway protocol (IGP) neighbor with the node in the network 100. The node in the network 100 obtains the topology structure of the network 100 through BGP-LS or IGP, and sends the obtained topology structure of the network 100 to the management device.

Operation 202: The management device determines the first-type node from the nodes included in the network 100.

The nodes in the network 100 may be classified into the first-type node and the second-type node based on whether the node supports SRv6. The first-type node is the node that supports SRv6, and the second-type node is the node that does not support SRv6.

As assumed above, the network 100 includes six first-type nodes (namely, the node 101, the node 103, the node 104, the node 105, the node 107, and the node 108) and two second-type nodes (namely, the node 102 and the node 106) in total.

Any method available in this network environment for determining a type of the node in the network 100 may be applied to this embodiment.

For example, in some embodiments, the management device may determine a type of each node in the network 100 by the management device. For example, the management device may obtain SRv6 indication information. The SRv6 indication information is used to indicate whether each node in the network 100 supports SRv6. In this case, the management device may determine, based on the SRv6 indication information, the first-type node included in the network 100.

Optionally, in some embodiments, the management device may obtain the SRv6 indication information in a process of determining the topology structure of the network 100. For example, in the process of determining the topology structure of the network 100, the management device may obtain topology information reported by each node in the network 100. The topology information includes the SRv6 indication information.

Optionally, in other embodiments, the management device may send SRv6 query information to each node in the network 100. After receiving the SRv6 query information, the node in the network 100 sends SRv6 query feedback information to the management device. The SRv6 query feedback information is used to indicate whether the node supports SRv6.

For another example, in some other embodiments, the management device may determine the type of each node in the network 100 based on a manual annotation of an administrator. For example, the administrator of the management device may view a maintenance log of the network 100 or manually query attribute information of each node in the network 100 to determine whether each node in the network 100 supports SRv6, and store a determining result in the management device. In this case, the management device may determine the first-type node in the network 100 based on the stored determining result.

Operation 203: The management device determines a target topology structure corresponding to the network 100.

Figure 3:
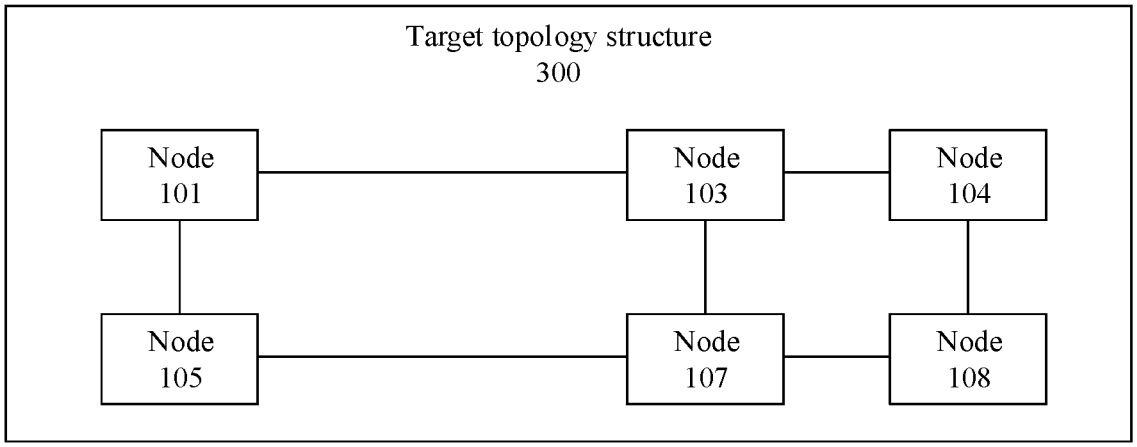
FIG. 3 is a schematic diagram of a target topology structure that is corresponding to a network 100 and that is determined by a management device according to an embodiment of this application.

FIG. 3 is a schematic diagram of the target topology structure that is corresponding to the network 100 and that is determined by the management device. A target topology structure 300 shown in FIG. 3 includes the first-type nodes in the network 100 but does not include a second-type network node in the network 100. The target topology structure 300 shown in FIG. 3 includes the node 101, the node 103, the node 104, the node 105, the node 107, and the node 108, but does not include the node 102 and the node 106.

If two adjacent nodes in the network 100 both are first-type nodes, the management device may determine that a connection relationship between the two nodes in the network 100 is the same as that in the target topology structure. For example, a connection relationship between the node 101 and the node 105, a connection relationship between the node 103 and the node 104, a connection relationship between the node 104 and the node 108, a connection relationship between the node 103 and the node 107, and a connection relationship between the node 101 and the node 105 in the target topology structure 300 are the same as those in the network 100. For ease of description, a path between two nodes between which a connection relationship in the network 100 is the same as a connection relationship in the target topology structure may be referred to as a second-type target path. In other words, in the target topology structure shown in FIG. 3, a path between the node 101 and the node 105, a path between the node 103 and the node 104, a path between the node 104 and the node 108, a path between the node 103 and the node 107, and a path between the node 101 and the node 105 are all second-type target paths.

If one or more second-type nodes are included between two first-type nodes in the network 100, the management device may determine that there is a directly connected path between the two first-type nodes in the target topology structure. In addition, the management device may further determine, in the network 100, one or more paths corresponding to the path. For ease of description, a path between two nodes between which a connection relationship in the network 100 is different from a connection relationship in the target topology structure may be referred to as a first-type target path. In other words, in the target topology structure 300 shown in FIG. 3, a path between the node 101 and the node 103, a path between the node 101 and the node 107, a path between the node 105 and the node 103, and a path between the node 105 and the node 107 are first-type target paths.

The following describes the first-type target path by using the node 101 and the node 103 as an example. For ease of description, in the following, the first-type target path between the node 101 and the node 103 in the target topology structure 300 is referred to as a first-type target path 1. A path between two adjacent nodes in the network 100 is referred to as a link. A path between the node 101 and the node 102 is referred to as a link 12, a path between the node 102 and the node 103 is referred to as a link 23, and so on.

In the network 100, the node 101 may communicate with the node 103 through a plurality of paths. For example, a path 1 may include the link 12 and the link 23. A path 2 may include the link 12, a link 26, a link 67, and a link 73. A path 3 may include a link 15, a link 56, a link 62, and the link 23. A path 4 may include the link 15, the link 56, the link 67, and the link 73. It can be learned that each of the path 1 to the path 4 includes at least one second-type node.

The path 1, the path 2, the path 3, and the path 4 may be referred to as paths corresponding to the first-type target path 1. In other words, in the target topology structure 300, the first-type target path 1 has four corresponding paths in the network 100: the path 1, the path 2, the path 3, and the path 4. Similarly, in the target topology structure 300, the first-type target path between the node 101 and the node 107 also has a plurality of corresponding paths in the network 100. The first-type target path between the node 105 and the node 107 also has a plurality of corresponding paths in the network 100. The first-type target path between the node 105 and the node 103 also has a plurality of corresponding paths in the network 100.

In conclusion, the management device may determine that the target topology structure includes four first-type target paths and five second-type target paths in total.

Operation 204: The management device may determine a transmission overhead of each of the four first-type target paths.

In some embodiments, the transmission overhead is a transmission delay. In some other embodiments, the transmission overhead is a transmission cost. The transmission cost may also be referred to as a link cost. In some other embodiments, the transmission overhead may include a transmission cost and a transmission delay. In some other embodiments, the transmission overhead may be a value determined based on a transmission cost and a transmission delay. For example, the transmission overhead may be determined according to a formula 1:

$$Con = \alpha \times C + \beta \times D \qquad \text{(the formula 1)}$$

Con represents the transmission overhead, C represents the transmission cost, D represents the transmission delay, α represents a weight coefficient corresponding to the transmission overhead, and β represents a weight coefficient corresponding to the transmission delay. α and β are numbers greater than 0.

The first-type target path 1 is still used as an example to describe a specific implementation in which the management device determines the transmission overhead of the first-type target path.

Optionally, in some embodiments, the management device may obtain a transmission overhead between two adjacent nodes on each of the four paths (namely, the path 1 to the path 4) corresponding to the first-type target path 1. For example, topology information obtained by the management device may include a transmission overhead between two adjacent nodes in the network 100. The path 1 is used as an example. The management device may obtain a transmission overhead between the node 101 and the node 102 (namely, a transmission overhead of the link 12). The management device may further obtain a transmission overhead between the node 102 and the node 103 (namely, a transmission overhead of the link 23). In this way, the management device may determine that a transmission overhead of the path 1 (hereinafter referred to as a transmission overhead 1) is a sum of the transmission overhead of the link 12 and the transmission overhead of the link 23. Similarly, the management device may determine a transmission overhead of the path 2 (hereinafter referred to as a transmission overhead 2), a transmission overhead of the path 3 (hereinafter referred to as a transmission overhead 3), and a transmission overhead of the path 4 (hereinafter referred to as a transmission overhead 4). After determining the transmission overhead 1 to the transmission overhead 4, the management device may determine a transmission overhead of the first-type target path 1 as a smallest value of the transmission overhead 1 to the transmission overhead 4.

In some embodiments, the transmission overhead includes the transmission cost and the transmission delay. In this case, a smallest value of a plurality of transmission overheads may be a value of a transmission overhead with a smallest transmission delay in the plurality of transmission overheads.

In some other embodiments, the transmission overhead includes the transmission cost and the transmission delay. In this case, a smallest value of a plurality of transmission overheads may be a value of a transmission overhead with a smallest transmission cost in the plurality of transmission overheads.

In some embodiments, the transmission overhead includes the transmission cost and the transmission delay. In this case, when transmission delays are different, a smallest value of a plurality of transmission overheads is a smallest value of the transmission delays. Alternatively, when transmission delays are the same, a smallest value of a plurality of transmission overheads is a smallest value of transmission costs.

Optionally, in some other embodiments, the management device may perform transmission overhead measurement on the first-type target path 1, to obtain the transmission overhead of the first-type target path 1.

For example, the management device may send measurement information to a target node. The measurement information is used to indicate the target node to perform delay measurement. The target node may be the node 101 and/or the node 103. After receiving the measurement information, the target node may perform delay measurement. For example, the target node may use a technology, such as a network quality analysis (NQA) technology, a two-way active measurement protocol (TWAMP), or a packet internet groper (PING) to perform delay measurement on the path between the node 101 and the node 103. The target node may obtain the transmission delay of the first-type target path 1. The target node may send measurement feedback information to the management device. The measurement feedback information includes the transmission overhead of the first-type target path 1.

In some embodiments, the target node may directly send a measured transmission delay to the management device as a transmission overhead.

In some other embodiments, the target node may determine a transmission cost based on a transmission delay, and send the transmission delay and the transmission cost to the management device as a transmission overhead. For example, the target node may determine, based on a preset correspondence between a transmission cost and a transmission delay, a transmission overhead corresponding to the measured transmission delay. For another example, the target node may determine, according to on a preset formula, a transmission overhead corresponding to the measured transmission delay.

In some other embodiments, the target node may determine a transmission cost based on a transmission delay, and send the transmission cost to the management device as a transmission overhead.

In this case, the management device may directly obtain the transmission overhead of the first-type target path 1. The transmission overhead of the first-type target path 1 is a smallest value of transmission overheads from the node 101 to the node 103.

Similarly, the management device may determine a transmission overhead of the first-type target path between the node 101 and the node 107 in the target topology structure 300, a transmission overhead of the first-type target path between the node 105 and the node 107, and a transmission overhead of the first-type target path between the node 105 and the node 103.

A manner of determining a transmission overhead of each of the five second-type target paths is the same as or similar to a manner of determining the transmission overhead of the first-type target path. For example, the topology information obtained by the management device may include the transmission overhead between two adjacent nodes in the network 100. In this way, the management device can directly determine the transmission overhead of each second-type target path. For another example, the management device may alternatively determine the transmission overhead of each of the five second-type target paths through measurement. A specific measurement manner is the same as a measurement manner for measuring the transmission overhead of the first-type target path. For brevity, details are not described herein again.

Operation 205: The management device may perform path computation based on the transmission overheads of the four first-type target paths and the target topology structure.

For example, if the management device wants to determine a path from the node 101 to the node 108, the management device may determine, based on the four first-type target paths, whether the path reaches the node 108 through the node 103 or the node 107. For ease of description, it is assumed that the transmission overhead is the transmission delay. It is assumed that a transmission delay from the node 101 to the node 103 is 2 ms, a transmission overhead from the node 101 to the node 107 is 3 ms, a transmission overhead from the node 103 to the node 104 is 2 ms, and a transmission overhead from the node 104 to the node 108 is 1 ms, and a transmission overhead from the node 107 to the node 108 is 8 ms. If the path from the node 101 to the node 108 passes through the node 103 and the node 104, a total transmission overhead is 5 ms. If the path from the node 101 to the node 108 passes through the node 107, a total transmission overhead is 11 ms. In this case, the management device may determine that the path from the node 101 to the node 108 passes through the node 103 and the node 104.

Figure 4:
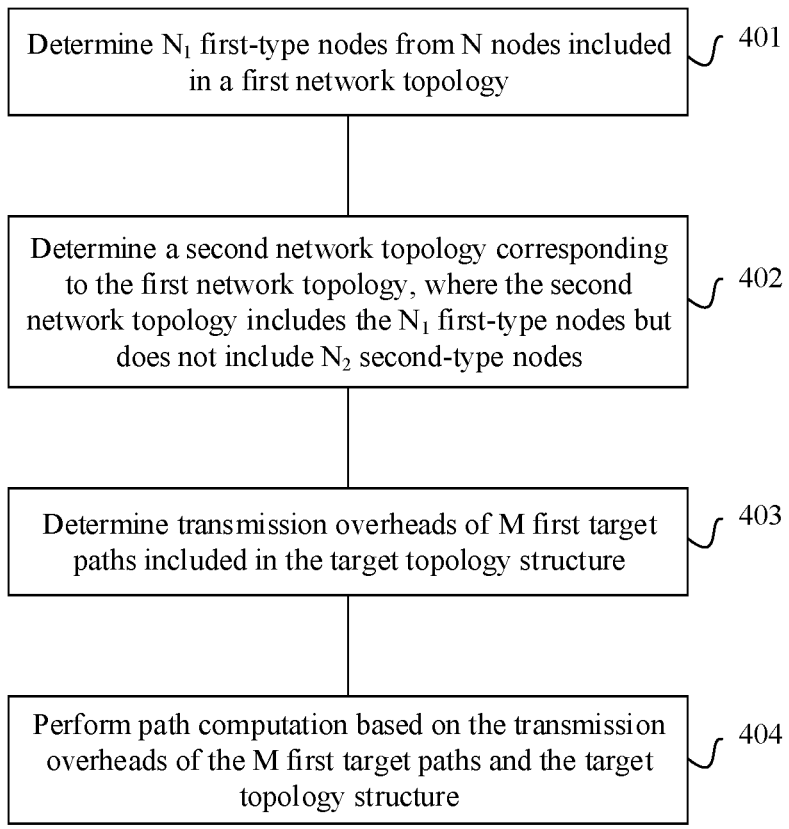
FIG. 4 is a schematic flowchart of a path determining method according to an embodiment of this application.

FIG. 4 is a schematic flowchart of a path determining method according to an embodiment of this application. The method shown in FIG. 4 may be implemented by a management device or a component (for example, a chip or a circuit) in a management device.

Operation 401: Determine $N_1$ first-type nodes from N nodes included in a first network topology, where the N nodes include the $N_1$ first-type nodes and $N_2$ second-type nodes, the first-type node supports SRv6, $N_1$ is a positive integer greater than or equal to 2, and $N_2$ is a positive integer greater than or equal to 1.

Operation 402: Determine a second network topology corresponding to the first network topology, where the second network topology includes the $N_1$ first-type nodes but does not include the $N_2$ second-type nodes, the target topology structure includes M first-type target paths, an $i^{th}$ first-type target path in the M first-type target paths corresponds to $K_i$ paths in the first network topology, a source node and a destination node of the $K_i$ paths are the same as a source node and a destination node of the $i^{th}$ first-type target path, each of the $K_i$ paths includes at least one second-type node, M is a positive integer greater than or equal to 1, i=1, ..., or M, and $K_i$ is a positive integer greater than or equal to 2.

For example, the first network topology may be the network topology structure of the network 100 shown in FIG. 1. The node 101, the node 103, the node 104, the node 105, the node 107, and the node 108 in the network 100 may be first-type nodes, and the node 102 and the node 106 may be second-type nodes. The second network topology may be the target topology structure 300 shown in FIG. 3. The target topology structure 300 includes the node 101, the node 103, the node 104, the node 105, the node 107, and the node 108.

Operation 403: Determine transmission overheads of the M first-type target paths, where a transmission overhead of the $i^{th}$ first-type target path is a smallest value of transmission overheads of the $K_i$ paths.

Operation 404: Perform path computation based on the transmission overheads of the M first-type target paths and the second network topology.

In one embodiment, the first-type node is a node that supports SRv6 in the N nodes, and the second-type node is a node that does not support SRv6 in the N nodes. Alternatively, the first-type node is a key node in the N nodes, and the second-type node is a non-key node in the N nodes.

In one embodiment, the method further includes: obtaining a transmission overhead between two adjacent nodes in the first network topology. Determining the transmission overheads of the M first-type target paths includes: determining a transmission overhead of each of the $K_i$ paths based on a transmission overhead between two adjacent nodes on each of the $K_i$ paths, and determining the smallest value of the transmission overheads of the $K_i$ paths as the transmission overhead of the $i^{th}$ first-type target path.

In one embodiment, determining the transmission overheads of the M first-type target paths includes: performing transmission overhead measurement on the $i^{th}$ first-type target path to obtain the transmission overhead of the $i^{th}$ first-type target path.

In one embodiment, the performing transmission overhead measurement on the $i^{th}$ first-type target path to obtain the transmission overhead of the $i^{th}$ first-type target path includes: sending measurement information to the source node and/or the destination node of the $i^{th}$ first-type target path; and receiving measurement feedback information from the source node and/or the destination node of the $i^{th}$ first-type target path. The measurement feedback information includes the transmission overhead of the $i^{th}$ first-type target path.

In one embodiment, the second network topology further includes P second-type target paths, each of the P second-type target paths includes two of the $N_1$ first-type nodes, and the first network topology includes the P second-type target paths.

In one embodiment, the transmission overhead includes a transmission cost and a transmission delay.

For a specific implementation of each operation of the method shown in FIG. 4, refer to the embodiment shown in FIG. 2. For brevity, details are not described herein again.

Figure 5:
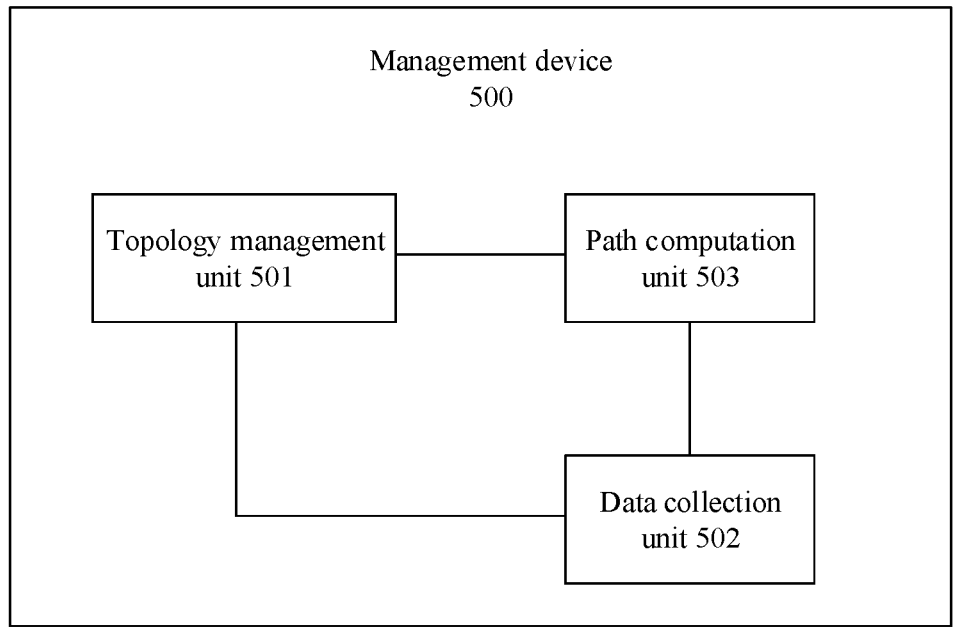
FIG. 5 is a schematic structural block diagram of a management device according to an embodiment of this application.

FIG. 5 is a schematic structural block diagram of a management device according to an embodiment of this application. A management device 500 shown in FIG. 5 includes a topology management unit 501, a data collection unit 502, and a path computation unit 503.

The topology management unit 501 is configured to determine $N_1$ first-type nodes from N nodes included in a first network topology. The N nodes include the $N_1$ first-type nodes and $N_2$ second-type nodes. The first-type node supports segment routing over internet protocol version 6 SRv6. $N_1$ is a positive integer greater than or equal to 2, and $N_2$ is a positive integer greater than or equal to 1.

The topology management unit 501 is further configured to determine a second network topology corresponding to the first network topology. The second network topology includes the $N_1$ first-type nodes but does not include the $N_2$ second-type nodes. The target topology structure includes M first-type target paths. An $i^{th}$ first-type target path in the M first-type target paths corresponds to $K_i$ paths in the first network topology. A source node and a destination node of the $K_i$ paths are the same as a source node and a destination node of the $i^{th}$ first-type target path. Each of the $K_i$ paths includes at least one second-type node. M is a positive integer greater than or equal to 1, i=1, ..., or M, and $K_i$ is a positive integer greater than or equal to 2.

The data collection unit 502 is configured to determine transmission overheads of the M first-type target paths, where a transmission overhead of the $i^{th}$ first-type target path is a smallest value of transmission overheads of the $K_i$ paths.

The path computation unit 503 is configured to perform path computation based on the transmission overheads of the M first-type target paths and the second network topology.

In one embodiment, the first-type node is a node that supports SRv6 in the N nodes, and the second-type node is a node that does not support SRv6 in the N nodes. Alternatively, the first-type node is a key node in the N nodes, and the second-type node is a non-key node in the N nodes.

In one embodiment, a transmission overhead between two adjacent nodes in the first network topology is obtained. The data collection unit 502 is specifically configured to: determine a transmission overhead of each of the $K_i$ paths based on a transmission overhead between two adjacent nodes on each of the $K_i$ paths, and determine the smallest value of the transmission overheads of the $K_i$ paths as the transmission overhead of the $i^{th}$ first-type target path.

In one embodiment, the data collection unit 502 is specifically configured to perform transmission overhead measurement on the $i^{th}$ first-type target path to obtain the transmission overhead of the $i^{th}$ first-type target path In one embodiment, the data collection unit 502 is specifically configured to: send measurement information to the source node and/or the destination node of the $i^{th}$ first-type target path; and receive measurement feedback information from the source node and/or the destination node of the $i^{th}$ first-type target path, where the measurement feedback information includes the transmission overhead of the $i^{th}$ first-type target path.

In one embodiment, the second network topology further includes P second-type target paths, each of the P second-type target paths includes two of the $N_1$ first-type nodes, and the first network topology includes the P second-type target paths.

In one embodiment, the transmission overhead includes a transmission cost and a transmission delay.

For specific functions of the topology management unit 501, the data collection unit 502, and the path computation unit 503, refer to the method shown in FIG. 2. For brevity, details are not described herein again.

The topology management unit 501, the data collection unit 502, and the path computation unit 503 may be implemented by a processor.

Figure 6:
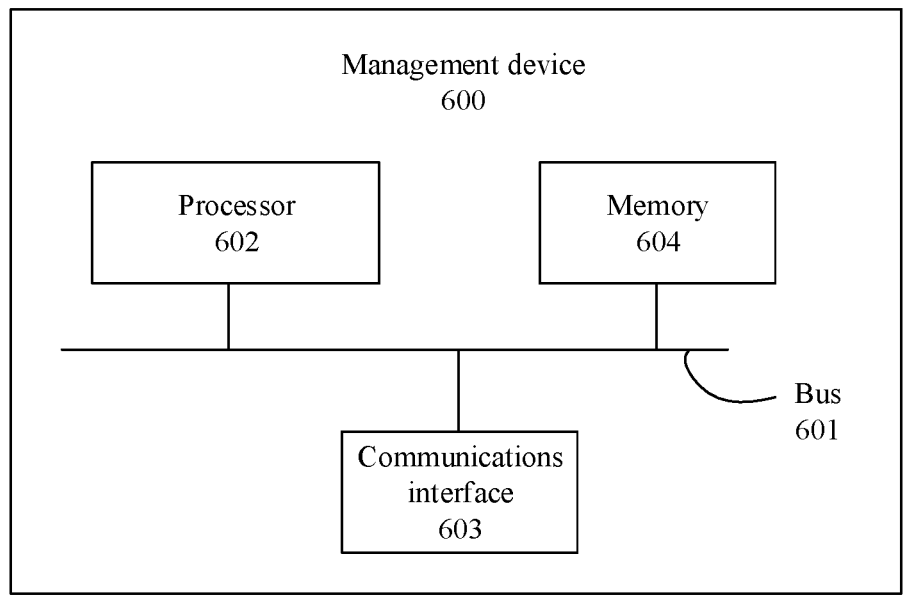
FIG. 6 is a schematic structural block diagram of a management device according to an embodiment of this application.

FIG. 6 is a schematic structural block diagram of a management device according to an embodiment of this application. The management device 600 includes a bus 601, a processor 602, a communications interface 603, and a memory 604. The processor 602, the memory 604, and the communications interface 603 communicate with each other through the bus 601. The processor 602 may be a field programmable gate array (FPGA), an application-specific integrated circuit (ASIC), system on chip (SoC), a central processing unit (CPU), a network processor (NP), a digital signal processor (DSP), a micro controller unit (MCU), a programmable logic device (PLD), another programmable logic device, a discrete gate or transistor logic device, a discrete hardware component, or another integrated chip. The memory 604 stores executable code included in a management device. The processor 602 reads the executable code in the memory 604 to perform the method shown in FIG. 2 or FIG. 4. The memory 604 may further include another software module, such as an operating system, required for running a process. The operating system may be LINUX™, UNIX™, WINDOWS™, or the like.

An embodiment of this application further provides a chip system, including a logic circuit. The logic circuit is configured to be coupled to an input/output interface, and perform data transmission through the input/output interface, to perform the method shown in FIG. 2 or FIG. 4.

In an implementation process, operations in the foregoing methods can be implemented by using a hardware integrated logical circuit in the processor, or by using instructions in a form of software. The operations of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that the processor in the embodiments of this application may be an integrated circuit chip, and has a signal processing capability. In an implementation process, operations in the foregoing method embodiments can be implemented by using a hardware integrated logical circuit in the processor, or by using instructions in a form of software. A general-purpose processor may be a microprocessor, or the processor may be any conventional processor or the like. The operations of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the methods provided in the embodiments of this application, this application further provides a computer program product. The computer program product includes computer program code. When the computer program code is run on a computer, the computer is enabled to perform the method in any embodiment shown in FIG. 2 or FIG. 4.

According to the methods provided in the embodiments of this application, this application further provides a computer-readable medium. The computer-readable medium stores program code. When the program code is run on a computer, the computer is enabled to perform the method in any embodiment shown in FIG. 2 or FIG. 4.

According to the methods provided in the embodiments of this application, this application further provides a system, including the foregoing management device. The system further includes a plurality of nodes. The plurality of nodes include at least two nodes that support SRv6.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A path determining method, comprising:
    determining a plurality of first-type nodes from a plurality of nodes comprised in a first network topology, wherein the plurality of nodes further comprises one or more second-type nodes, each first-type node supports segment routing over internet protocol version 6 (SRv6);
    determining a second network topology corresponding to the first network topology, wherein the second network topology comprises the first-type nodes but does not comprise the second-type nodes, a target topology structure comprises M first-type target paths, an $i^{th}$ first-type target path in the M first-type target paths corresponds to $K_i$ paths in the first network topology, a source node and a destination node of the $K_i$ paths are same as a source node and a destination node of the $i^{th}$ first-type target path, each of the $K_i$ paths comprises at least one second-type node, M is a positive integer greater than or equal to 1, i=1, . . . , or M, and $K_i$ is a positive integer greater than or equal to 2;
    determining transmission overheads of the M first-type target paths; and
    performing path computation based on the transmission overheads of the M first-type target paths and the second network topology.

2. The method according to claim 1, wherein a second-type node is a node that does not support SRv6; or a first-type node is a key node that supports SRv6, and a second-type node is a non-key node that supports SRv6 or a node that does not support SRv6.

3. The method according to claim 1, wherein the determining transmission overheads of the M first-type target paths comprises:
    determining a transmission overhead of each of the $K_i$ paths based on a transmission overhead between two adjacent nodes on each of the $K_i$ paths; and
    determining a smallest value of the transmission overheads of the $K_i$ paths as the transmission overhead of the $i^{th}$ first-type target path.

4. The method according to claim 1, wherein the determining transmission overheads of the M first-type target paths comprises:
    performing transmission overhead measurement on the $i^{th}$ first-type target path to obtain the transmission overhead of the $i^{th}$ first-type target path.

5. The method according to claim 4, wherein the performing transmission overhead measurement on the $i^{th}$ first-type target path to obtain the transmission overhead of the $i^{th}$ first-type target path comprises:
    sending measurement information to the source node and/or the destination node of the $i^{th}$ first-type target path; and
    receiving measurement feedback information from the source node and/or the destination node of the $i^{th}$ first-type target path, wherein the measurement feedback information comprises the transmission overhead of the $i^{th}$ first-type target path.

6. The method according to claim 1, wherein the second network topology further comprises P second-type target paths, each of the P second-type target paths comprises two of the plurality of first-type nodes, and the first network topology comprises the P second-type target paths.

7. The method according to claim 1, wherein the transmission overhead comprises a transmission cost and/or a transmission delay.

8. An apparatus, comprising:
    at least one processor;
    one or more memories coupled to the at least one processor and storing instructions, which when executed by the at least one processor, cause the apparatus to:
    determine a plurality of first-type nodes from a plurality of nodes comprised in a first network topology, wherein the plurality of nodes further comprises one or more second-type nodes, each first-type node supports segment routing over internet protocol version 6 (SRv6);
    determine a second network topology corresponding to the first network topology, wherein the second network topology comprises the first-type nodes but does not comprise the second-type nodes, a target topology structure comprises M first-type target paths, an $i^{th}$ first-type target path in the M first-type target paths corresponds to $K_i$ paths in the first network topology, a source node and a destination node of the $K_i$ paths are same as a source node and a destination node of the $i^{th}$ first-type target path, each of the $K_i$ paths comprises at least one second-type node, M is a positive integer greater than or equal to 1, i=1, . . . , or M, and $K_i$ is a positive integer greater than or equal to 2;
    determine transmission overheads of the M first-type target paths; and
    perform path computation based on the transmission overheads of the M first-type target paths and the second network topology.

9. The apparatus according to claim 8, wherein a second-type node is a node that does not support SRv6; or
a first-type node is a key node that supports SRv6, and a second-type node is a non-key node that supports SRv6 or a node that does not support SRv6.

10. The apparatus according to claim 8, wherein the instructions executed by the at least one processor to further causes the apparatus to:
obtain a transmission overhead between two adjacent nodes in the first network topology; and
determine a transmission overhead of each of the $K_i$ paths based on a transmission overhead between two adjacent nodes on each of the $K_i$ paths; and
determine a smallest value of the transmission overheads of the $K_i$ paths as the transmission overhead of the $i^{th}$ first-type target path.

11. The apparatus according to claim 8, wherein the instructions executed by the at least one processor to further causes the apparatus to: perform transmission overhead measurement on the $i^{th}$ first-type target path to obtain the transmission overhead of the $i^{th}$ first-type target path.

12. The apparatus according to claim 11, wherein the instructions executed by the at least one processor to further causes the apparatus to: send measurement information to the source node and/or the destination node of the $i^{th}$ first-type target path; and
receive measurement feedback information from the source node and/or the destination node of the $i^{th}$ first-type target path, wherein the measurement feedback information comprises the transmission overhead of the $i^{th}$ first-type target path.

13. The apparatus according to claim 8, wherein the second network topology further comprises P second-type target paths, each of the P second-type target paths comprises two of the plurality of first-type nodes, and the first network topology comprises the P second-type target paths.

14. The apparatus according to claim 8, wherein the transmission overhead comprises a transmission cost and/or a transmission delay.

15. A non-transitory storage medium storing a program, which when executed by one or more processors, cause the one or more processors to perform operations, the operations comprising:
determining a plurality of first-type nodes from a plurality of nodes comprised in a first network topology, wherein the plurality of nodes further comprises one or more second-type nodes, each first-type node supports segment routing over internet protocol version 6 (SRv6);
determining a second network topology corresponding to the first network topology, wherein the second network topology comprises the first-type nodes but does not comprise the second-type nodes, a target topology structure comprises M first-type target paths, an $i^{th}$ first-type target path in the M first-type target paths corresponds to $K_i$ paths in the first network topology, a source node and a destination node of the $K_i$ paths are same as a source node and a destination node of the $i^{th}$ first-type target path, each of the $K_i$ paths comprises at least one second-type node, M is a positive integer greater than or equal to 1, i=1, . . . , or M, and $K_i$ is a positive integer greater than or equal to 2;
determining transmission overheads of the M first-type target paths; and
performing path computation based on the transmission overheads of the M first-type target paths and the second network topology.

16. The non-transitory storage medium according to claim 15, wherein a second-type node is a node that does not support SRv6; or
a first-type node is a key node that supports SRv6, and a second-type node is a non-key node that supports SRv6 or a node that does not support SRv6.

17. The non-transitory storage medium according to claim 15, wherein the operations further comprise:
determining a transmission overhead of each of the $K_i$ paths based on a transmission overhead between two adjacent nodes on each of the $K_i$ paths; and
determining a smallest value of the transmission overheads of the $K_i$ paths as the transmission overhead of the $i^{th}$ first-type target path.

18. The non-transitory storage medium according to claim 15, wherein the operations further comprise:
performing transmission overhead measurement on the $i^{th}$ first-type target path to obtain the transmission overhead of the $i^{th}$ first-type target path.

19. The non-transitory storage medium according to claim 18, wherein the operations further comprise:
sending measurement information to the source node and/or the destination node of the $i^{th}$ first-type target path; and
receiving measurement feedback information from the source node and/or the destination node of the $i^{th}$ first-type target path, wherein the measurement feedback information comprises the transmission overhead of the $i^{th}$ first-type target path.

20. The non-transitory storage medium according to claim 15, wherein the transmission overhead comprises a transmission cost and/or a transmission delay.

* * * * *